United States Patent [19]

Shimizu et al.

[11] Patent Number: 5,424,377
[45] Date of Patent: Jun. 13, 1995

[54] PROCESS TO PREVENT SCALE ADHESION USING CONDENSATION PRODUCT OF AROMATIC AMINE AND A QUINONE

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 172,820

[22] Filed: Dec. 27, 1993

[30] Foreign Application Priority Data

Dec. 30, 1992 [JP] Japan .................................. 4-361218
Jan. 13, 1993 [JP] Japan .................................. 5-020662

[51] Int. Cl.$^6$ .............................................. C08F 2/00
[52] U.S. Cl. ...................... 526/62; 528/243; 210/698
[58] Field of Search .............. 526/62, 74; 528/243; 210/698

[56] References Cited

U.S. PATENT DOCUMENTS 4,831,107 5/1989 Erhan .................................. 528/392
5,053,466 10/1991 Shimizu et al. ........................ 526/62

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A process to prevent scale adhesion to reactor surfaces using an alkaline solution of the condensation product of an aromatic diamino compound and a quinone. The aromatic amino compound has the general formula (1):

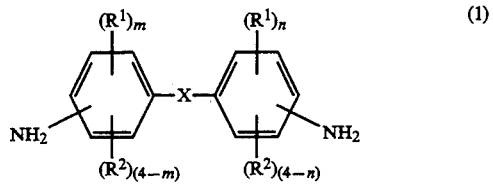

wherein $R^1$ is at least one group selected from the group consisting of —OH, —COOH and —SO$_3$H, $R^2$ is a hydrogen atom or a substituent group, X is a single bond or a divalent group of the formula —CH=CH—, and m and n are each an integer from 0 to 4, provided m and n are not simultaneously zero, when a plurality of $R^1$ groups are present they may be identical or different, and when a plurality of $R^2$ groups are present they may be identical or different, with (A-2) a quinone compound, and a process for producing a polymer using the agent are disclosed.

14 Claims, No Drawings

PROCESS TO PREVENT SCALE ADHESION USING CONDENSATION PRODUCT OF AROMATIC AMINE AND A QUINONE

BACKGROUND OF THE INVENTION

1. Field of the Invention

The present invention relates to a polymer scale preventive agent for use in polymerization of a monomer having an ethylenically unsaturated double bond, and to a polymerization vessel and a process for producing a polymer which utilize the polymer scale preventive agent.

2. Description of the Prior Art

Heretofore, methods for polymerization of a monomer having an ethylenically unsaturated double bond have been known, such as suspension, emulsion, solution, gas phase and bulk polymerization processes and the like. In any of these polymerization processes, polymer scale is liable to be deposited on the areas with which the monomer comes into contact, such as inner walls, stirring equipment and so on of a polymerization vessel.

The deposition of the polymer scale results in disadvantages that the yield of the polymer and cooling capacity of the polymerization vessel are lowered, and that the polymer scale may peel off and mix into a polymeric product, thereby impairing the quality of formed products obtained by processing the polymeric product. In addition, removal of deposited polymer scale is very laborious and time-consuming. Further, the polymer scale contains unreacted monomers and, therefore, may cause physical disorders in the operators, which has been a very serious problem in recent years.

For preventing polymer scale deposition on the polymerization vessel inner wall and so forth, methods have been known, for example, a method in which a polymer scale preventive agent comprising a polar organic compound such as amine compounds, quinone compounds, aldehyde compounds, etc. is applied to the polymerization vessel inner wall and so on to form a coating and a method in which such compounds are added to an aqueous medium (Japanese Patent Publication (KOKOKU) No. 45-30343 (1960)), as practiced in some instances of suspension polymerization of vinyl chloride.

However, these methods have the disadvantage that, although the polymer scale preventive effect is exhibited while polymerization is repeated for up to about 5 or 6 batches, the effect diminishes if the number of repeated batches of polymerization exceeds 5 or 6 (that is, the scale preventive effect is poor in durability). The disadvantage is emphasized particularly where a water-soluble catalyst is used for polymerization, and, in this point, the polymer scale prevention according to these methods is unsatisfactory industrially.

For overcoming the above disadvantage, methods have been proposed in which the inner wall of a polymerization vessel is coated with a polymer scale preventive agent whose effective constituent is, for example, a condensation product of an aromatic amine compound and an aromatic nitro compound (Japanese Patent Publication (KOKOKU) No. 60-30681 (1985)), a reaction product of a phenolic compound with an aromatic aldehyde (Japanese Pre-examination Patent Publication (KOKAI) No. 57-192414 (1982)), a reaction product of a polyhydric phenol with an aliphatic aldehyde (Japanese Patent Publication (KOHYO) No. 57-502169 (1982)), a reaction product of 1-naphthol with formaldehyde (Japanese Patent Publication (KOKOKU) No. 01-31523 (1989)), or the like. Where one of these known polymer scale preventive agents is applied to the areas with which monomers come into contact, such as the inner wall surface of a polymerization vessel, and a coating is thereby formed, it is possible to repeat about 100 to 200 batches of polymerization without causing deposition of polymer scale on the areas located in the liquid-phase region inside the polymerization vessel. Besides, even in the above-mentioned case where a water-soluble catalyst is used, deposition of polymer scale in the liquid-phase region is similarly prevented.

However, there still remains a drawback that polymer scale deposition may occur on the areas around the interface between the liquid phase and the gas phase located at an upper portion of the interior of the polymerization vessel.

Once polymer scale deposition occurs the areas around the interface between the gas and liquid phases, the deposited scale will grow gradually as polymerization runs are repeated, and at last it may peel off to be incorporated into the polymeric product. If the polymeric product with the polymer scale thus mixed therein is processed into formed products such as sheets or the like, the polymer scale causes generation of many fish eyes in the formed products, thereby lowering seriously the quality of the formed products.

Besides, the polymeric product obtained upon polymerization is required to have a high whiteness. That is, when a polymeric product is formed into a sheet or the like without any addition of a coloring agent, the resulting formed product is more or less colored and such coloration, called initial coloration, is desired to be as slight as possible. However, the coating which contains a condensation product of an aromatic amine compound, etc. as mentioned above may peel off or dissolve in the polymerization mass, to be incorporated into the polymeric product, whereby the resulting formed products have poorer quality as to initial coloration.

SUMMARY OF THE INVENTION

It is an object of the present invention to provide a polymer scale preventive agent for use in polymerization of a monomer having an ethylenically unsaturated double bond that can prevent effectively the deposition of polymer scale, not only on the areas in the liquid-phase region but also on the areas around the interface between the gas and liquid phases inside a polymerization vessel, and that makes it possible to produce a polymer having a very small number of fish eyes and slight initial coloration when processed into formed products such as sheets or the like; and a polymerization vessel and a process for producing a polymer which utilize the polymer scale preventive agent.

That is, the present invention provides, as a means of achieving the above object, a polymer scale preventive agent for use in polymerization of a monomer having an ethylenically unsaturated double bond, comprising an alkaline solution containing (A) a condensation product of:

(A-1) a diamino aromatic compound having the general formula (1):

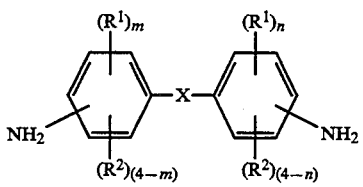

wherein $R^1$ is at least one group selected from the group consisting of —OH, —COOH and —SO$_3$H, $R^2$ is a hydrogen atom or a substituent group, X is a single bond or a divalent group of the formula —CH=CH—, and m and n are each an integer from 0 to 4, provided m and n are not simultaneously zero, when a plurality of $R^1$ groups are present they may be identical or different, and when a plurality of $R^2$ groups are present they may be identical or different, with (A-2) a quinone compound.

The present invention also provides a polymer scale preventive agent for use in polymerization of a monomer having an ethylenically unsaturated double bond which agent contains, in addition to the above-described condensation product (A), at least one compound selected from the group consisting of (B) a water-soluble polymeric compound and (C) an inorganic colloid Further, the present invention provides a process for producing a polymer of a monomer having an ethylenically unsaturated double bond, which comprises polymerizing the monomer in a polymerization vessel having a coating on its inner wall surfaces, whereby polymer scale is prevented from being deposited, wherein the coating has been formed by applying an alkaline solution containing the above-described condensation product (A), followed by drying.

According to the present invention, deposition of polymer scale in a polymerization vessel can be effectively prevented, not only on the areas in the liquid-phase region but also on the areas around the interface between the gas phase and the liquid phase. In addition, the polymeric product obtained by application of the present invention can be formed into sheets or the like which have very few fish eyes. Besides, the coating formed on the inner wall surfaces of a polymerization vessel according to the present invention will not peel off or dissolve into the polymerization mass during polymerization, so that the polymeric product obtained exhibits high whiteness, or low initial coloration, when formed into sheets or the like.

Furthermore, according to the present invention, the coating liquid used for formation of the coating can have water as a major component of solvent, and, therefore, the amount of organic solvent can be limited to a range such that there is little fear of inflammation, explosion or the like and there is no problem in regard of toxicity or the like.

Moreover, where polymerization is conducted by applying the present invention, the operation of removing polymer scale need not be performed every run of polymerization, and productivity is thereby improved.

DETAILED DESCRIPTION OF PREFERRED EMBODIMENTS

The present invention will now be described in detail below.

(A) Condensation product (A-1) Diamino aromatic compound

The diamino aromatic compound (A-1) having the general formula (1) includes diaminodiphenyl compounds of the general formula (1) wherein X is a single bond, and diamino stilbene compounds of the general formula (1) wherein X is —CH=CH—.

Diaminodiphenyl compounds

The diaminodiphenyl compounds include, for example, compounds having the general formula (2):

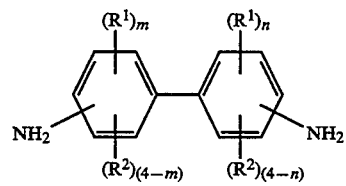

wherein m and n are each an integer from 1 to 4, $R^1$ is at least one group selected from the group consisting of —OH, —COOH and —SO$_3$H, and $R^2$ is at least one atom or group selected from the group consisting of —H, —NH$_2$, —Cl, —Br, —NO$_2$, —COCH$_3$, —OCH$_3$, —N(CH$_3$)$_2$ and alkyl groups of from 1 to 3 carbon atoms, provided when a plurality of $R^1$ groups are present they may be identical or different, and when a plurality of $R^2$ groups are present they may be identical or different.

Specifically, the compounds of the general formula (2) include, for example, 4,4'-diaminobiphenyl-3,3'-diol, 4,4'-diaminobiphenyl-3,3'-dicarboxylic acid, 4,4'-diaminodiphenyl-3,3'-disulfonic acid, 3,3'-dimethyl-4,4'-diaminobiphenyl-6,6'-disulfonic acid and the like.

Diaminostilbene compounds

The diaminostilbene compounds include, for example, compounds having the general formula (3):

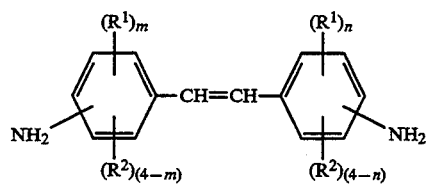

wherein m and n are each an integer from 1 to 4, $R^1$ is a group selected from the group consisting of —OH, —COOH and —SO$_3$H, and $R^2$ is at least one atom or group selected from the group consisting of —H, —NH$_2$, —Cl, —Br, —NO$_2$, —COCH$_3$, —OCH$_3$, —N(CH$_3$)$_2$ and alkyl groups of from 1 to 3 carbon atoms, provided when a plurality of $R^1$ groups are present they may be identical or different, and when a plurality of $R^2$ groups are present they may be identical or different.

Specific examples of the compounds of the general formula (3) include 4,4'-diaminostilbene-3,3'-diol, 4,4'-diaminostilbene-3,3'-dicarboxylic acid, 4,4'-diaminostilbene-3,3'-disulfonic acid, 3,3'-dimethyl-4,4'-diaminostilbene-2,2'-disulfonic acid, and the like.

(A-2) Quinone compound

The quinone compound (A-2) includes, for example, the compounds of the general formulas (4) to (7):

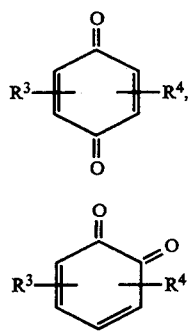

wherein in the general formulas (4) and (5), $R^3$ represents —H, —NH$_2$, —Cl, —OH, —NO$_2$, —COCH$_3$, —OCH$_3$, —N(CH$_3$)$_2$ or an alkyl group of from 1 to 3 carbon atoms, and $R^4$ represents —H, —NH$_2$, —OH, —CH$_3$, —COOH or —SO$_3$H,

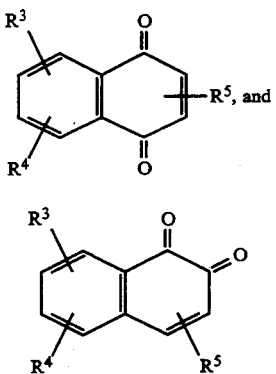

wherein in the general formulas (6) and (7), $R^3$ and $R^4$ are as defined above, and $R^5$ represents —H, —OH, —CH$_3$, —Cl, —COCH$_3$, —OCH$_3$, —COOH or —SO$_3$H.

Specific examples of the compounds of the general formulas (4) and (5) include o-, m- and p-benzoquinones, hydroxy-p-benzoquinone, chloro-p-benzoquinone, bromo-p-benzoquinone, duroquinone, chloranil and the like.

Specific examples of the compounds of the general formulas (6) and (7) include 6-methyl-1,4-naphthoquinone, 2-methyl-1,4-naphthoquinone, lawsone, juglone, plumbagin, α-naphthoquinone, β-naphthoquinone and the like.

The quinone compounds as above may be used either singly or in combination of two or more.

Condensation reaction

The condensation product (A) can be prepared by reacting the diamino aromatic compound (A-1) with the quinone compound (A-2) in a suitable medium, optionally in the presence of a catalyst as required, normally at a temperature of from room temperature to 200° C. for a time of from 0.5 to 100 hours, and preferably at room temperature to 150° C. for 3 to 30 hours. Since the quinone compound acts also as a condensation catalyst, it is normally unnecessary to add other condensation catalyst to the reaction system.

The other condensation catalysts than the quinone compound which can be added, if required, include, for example, azo compounds such as α,α'-azobisisobutyronitrile, α,α'-azobis-2,4-dimethylvaleronitrile and the like; elemental or molecular simple-substance halogens such as iodine, bromine, chlorine, fluorine and the like; inorganic peroxides such as hydrogen peroxide, sodium peroxide, potassium persulfate, ammonium persulfate and the like; organic peroxides such as peracetic acid, benzoyl peroxide, cumene hydroperoxide, perbenzoic acid, p-menthane hydroperoxide and the like; oxo-acids such as iodic acid, periodic acid, potassium periodide, sodium perchlorate and the like and their salts; metallic salts such as ferrous chloride, ferric chloride, copper sulfate, cuprous chloride and the like; aromatic nitro compounds such as o-, m- and p-oxynitrobenzenes, o-, m- and p-nitroanisoles, o-, m- and p-chloronitrobenzenes, o-, m- and p-nitrobenzoic acids, o-, m- and p-nitrobenzenesulfonic acids, and the like; and so forth.

As a medium for carrying out the above condensation reaction, organic solvents such as alcohols, ketones, esters and the like can be used, among which preferred are those organic solvents which are miscible with water. The organic solvents miscible with water include, for example, alcohols such as methanol, ethanol, propanol and the like, ketones such as acetone, methyl ethyl ketone and the like, and esters such as methyl acetate, ethyl acetate and the like, among which particularly preferred are alcohols. Further, mixed solvents of water and such an organic solvent miscible with water as above-mentioned may also be used.

The medium for condensation reaction normally has a pH in the range from 1 to 13, and pH adjusters may be used without any particular restrictions.

The relative amounts of the diamino aromatic compound (A-1) and the quinone compounds (A-2) to be brought into the condensation reaction depend on the kinds of the compounds (A-1) and (A-2) and solvent used, reaction temperature, reaction time and so on. Normally, it is preferable to use the quinone compound (A-2) in an amount of from 0.01 to 10 parts by weight, more preferably from 0.1 to 5 parts by weight, per part by weight of the diamino aromatic compound (A-1). If the amount of the quinone compound (A-2) is too large or too small, the resulting condensation product has a lower effect in preventing polymer scale deposition.

The reaction mixture containing the condensation product obtained upon the condensation reaction may be directly diluted with a solvent to a desired concentration, to be then used for preparation of a coating liquid. Some solvents, when used as the medium for condensation reaction, cause the condensation product to easily separate from the solvent of the reaction mixture. In such a case, the condensation product can be separated from the solvent and can then be used by dissolving it in a solvent suited to application of coating.

Polymer scale preventive agent

The polymer scale preventive agent according to the present invention comprises an alkaline solution containing the condensation product (A) as above-described. The polymer scale preventive agent is applied to inner wall surfaces, etc. of a polymerization vessel and is dried to form a coating, whereby polymer scale can be prevented from being deposited on the polymerization vessel inner wall or the like.

To prepare the polymer scale preventive agent, the solution containing the condensation product obtained by the condensation reaction as above is admixed with a solvent (which will be described below) as required, and the pH of the resulting solution is controlled to the alkaline side. Alternatively, the polymer scale preventive agent may be prepared by putting the condensation product-containing solution into cold water to precipitate the condensation product, then separating the precipitate by filtration and drying it, adding the solvent (described below) to the dried precipitate, and controlling the pH of the resulting solution to the alkaline side.

Because the polymer scale preventive agent of the present invention is made alkaline, the solubility of the condensation product (A) in the solvent is improved and a uniform solution can be obtained. Therefore, by applying the polymer scale preventive agent to the polymerization vessel inner wall surfaces, etc., an improved scale preventive effect can be obtained. The pH of the inventive polymer scale preventive agent preferably ranges from 7.5 to 13.5, more preferably from 8.0 to 12.5. For pH adjustment, alkaline compounds can be used, for example, alkali metal compounds such as LiOH, NaOH, KOH, $Na_2CO_3$, $Na_2HPO_4$ and the like, ammonium compounds such as $NH_4OH$ and the like, organic amine compounds such as ethylenediamine, monoethanolamine, triethanolamine, and so forth.

The solvent for use in preparation of the polymer scale preventive agent of the present invention includes, for example, water; alcohol solvents such as methanol, ethanol, propanol, butanol, 2-butanol, 2-methyl-1-propanol, 2-methyl-2-propanol, 3-methyl-1-butanol, 2-methyl-2-butanol, 2-pentanol and the like; ketone solvents such as acetone, methyl ethyl ketone, methyl isobutyl ketone and the like; ester solvents such as methyl formate, ethyl formate, methyl acetate, ethyl acetate, methyl acetoacetate and the like; ether solvents such as 4-methyldioxolan, ethylene glycol diethyl ether and the like; furans; aprotic solvents such as dimethylformamide, dimethyl sulfoxide, acetonitrile and the like; and so forth. These may be used either singly or as a mixed solvent of two or more thereof on a case-by-case basis.

Among the above solvents, preferred are water and mixed solvents of water and an organic solvent miscible with water. The organic solvents miscible with water include, for example, alcohol solvents such as methanol, ethanol, propanol and the like; ketone solvents such as acetone, methyl ethyl ketone and the like; and ester solvents such as methyl acetate, ethyl acetate and the like. The mixed solvents of water and an organic solvent miscible with water preferably contain the organic solvent in such an amount that there is no fear about inflammation, explosion or the like and safety in handling is ensured as to virulence, etc. Specifically, the amount of the organic solvent is preferably not more than 50% by weight, a more preferable amount being not more than 30% by weight.

The concentration of the condensation product in the alkaline solution is not specifically limited, as long as a total coating weight described later can be obtained. Normally, the concentration is in the range of about 0.001 to about 5% by weight, preferably 0.001 to 1% by weight.

In order to further enhance the polymer scale preventive effect, it is preferable to add to the above-described agent at least one member selected from the group consisting of (B) a water-soluble polymeric compound and (C) an inorganic colloid. More preferably, (B) and (C) are used together. These additives (B) and (C) enhance the scale preventive effect, presumably by interacting with the condensation product in such a manner as to improve the hydrophilicity of the surfaces being coated (in the case of the water-soluble polymeric compound (B)) or to improve adhesion to the polymerization vessel wall and so on (in the case of the inorganic colloid (C)).

(B) Water-soluble polymeric compound

The water-soluble polymeric compounds (B) which can be added to the polymer scale preventive agent include, for example, amphoteric polymeric compounds such as gelatin, casein and the like; anionic polymeric compounds such as polyacrylic acid, polystyrenesulfonic acid, carboxymethyl cellulose, alginic acid, and the like; cationic nitrogen-containing polymeric compounds such as polyvinyl pyrrolidone, polyacrylamide and the like; hydroxyl group-containing polymeric compounds such as polyvinyl alcohol, hydroxyethyl cellulose, hydroxypropyl cellulose, pectin and the like; and so forth.

Among the water-soluble polymeric compounds as above-mentioned, preferred are gelatin, casein, polyacrylic acid, carboxymethyl cellulose, polyvinyl pyrrolidone and pectin.

These water-soluble polymeric compounds are added in an amount of normally from 0.01 to 10 parts by weight, preferably from 0.05 to 2 parts by weight, per part by weight of the condensation product (A).

(C) Inorganic colloid

The inorganic colloids (C) which can be added to the polymer scale preventive agent are those obtained by a condensing method or a dispersing method using water as a dispersion medium, with the colloidal particles ranging from 1 to 500 mµ in size.

Specifically, the applicable inorganic colloids include, for example, colloids of an oxide, a hydroxide or a mixture thereof, the oxide and hydroxide being those of a metal such as aluminum, thorium, titanium, zirconium, antimony, tin, iron and the like; colloids of tungstic acid, vanadium pentoxide, gold and silver; silver iodide sol; colloids of selenium, sulfur, silica and the like; and so forth. Among these, preferred are colloids of an oxide, a hydroxide or a mixture thereof, the oxide and hydroxide being those of a metal selected from the group consisting of aluminum, titanium, zirconium, tin and iron; and colloidal silica.

The inorganic colloids (C) are added in an amount of normally from 0.01 to 10 parts by weight, preferably from 0.05 to 5 parts by weight, per part by weight of the condensation product (A).

Where the water-soluble polymeric compound (B) and the inorganic colloid (C) are used in combination, the amount of the inorganic colloid (C) preferably ranges from 5 to 3000 parts by weight, more preferably from 50 to 1000 parts by weight, per 100 parts by weight of the water-soluble polymeric compound (B).

Formation of coating

To form a coating on inner wall surfaces of a polymerization vessel using the polymer scale preventive agent prepared as above-described, first the agent is applied to the inner wall surfaces of the polymerization vessel. Then, the applied agent is dried sufficiently at a temperature ranging, for example, from room temperature to 100° C., optionally followed by washing with water.

The polymer scale preventive agent is preferably applied to not only the inner wall surfaces of a polymerization vessel but also other areas with which the monomer comes into contact during polymerization, for example, stirring blades, stirring shaft, baffles, condensers, headers, search coil, bolts, nuts, etc.

More preferably, for formation of the coating, the polymer scale preventive agent is applied to areas with which the monomer does not come into contact during polymerization but on which polymer scale may be deposited, for example, the inner surfaces, etc. of equipment and pipes of an unreacted monomer recovery system. Specifically, such areas include the inner surfaces of monomer distillation columns, condensers, monomer stock tanks, valves, and so on.

The method of applying the polymer scale preventive agent to the inner wall surfaces of a polymerization vessel is not particularly restricted, and includes, for example, brush coating, spray coating, a method by filling the polymerization vessel with the polymer scale preventive agent followed by withdrawal thereof, and the automatic coating methods as disclosed in Japanese Pre-examination Patent Publication (KOKAI) Nos. 57-61001 (1982) and 55-36288 (1980), Japanese Patent Publication (KOHYO) Nos. 56-501116 (1981) and 56-501117 (1981), and Japanese Pre-examination Patent Publication (KOKAI) No. 59-11303 (1984), etc.

The method of drying wet coated surfaces provided by application of the polymer scale preventive agent, is not restricted, either. For example, the following methods can be used: a method in which, after the agent is applied, hot air with a suitable elevated temperature is blown to the coated surface; a method in which the inner wall surfaces of a polymerization vessel and the surfaces of other parts to be coated are preliminarily heated, for example, to a temperature of 30° to 80° C., and the polymer scale preventive agent is directly applied to the heated surfaces; and so on. After dried, the coated surfaces are washed with water if necessary.

The coating obtained in this manner has a total coating weight after dried of normally from 0.001 to 5 g/m$^2$, and preferably from 0.05 to 2 g/m$^2$.

The formed coating has good durability and retains the polymer scale-preventing action; therefore, the above-described coating operation may not necessarily be carried out every batch of polymerization. Accordingly, productivity is improved.

Polymerization

After the formation of the coating on the inner wall surfaces of a polymerization vessel, and preferably also on other areas with which monomer may come into contact during polymerization, etc. by the coating operation as above, polymerization is carried out in accordance with conventional procedures. That is, a monomer having an ethylenically unsaturated double bond, a polymerization initiator (catalyst), and optionally a polymerization medium such as water, etc., a dispersing agent such as suspending agents, solid dispersing agents, nonionic or anionic emulsifying agents, etc., and the like are charged into the polymerization vessel, and then polymerization is carried out according to conventional procedures.

The monomers having an ethylenically unsaturated double bond which can be polymerized by applying the process of the present invention include, for example, vinyl halides such as vinyl chloride and the like; vinyl esters such as vinyl acetate, vinyl propionate and the like; acrylic acid, methacrylic acid, and their esters and salts; maleic acid, fumaric acid, and their esters and anhydrides; diene monomers such as butadiene, chloroprene, isoprene and the like; styrene; acrylonitrile; vinylidene halides; vinyl ethers; and so forth.

There are no particular restrictions on the type of polymerization to which the process according to the present invention can be applied. That is, the process of the present invention is effective in any of such polymerization types as suspension polymerization, emulsion polymerization, solution polymerization, bulk polymerization, and gas phase polymerization. Particularly, the process of the present invention is more suited to polymerizations in an aqueous medium, such as suspension polymerization and emulsion polymerization.

In the following, taking the cases of suspension polymerization and emulsion polymerization as an example, general procedures of polymerization will be described.

First, water and a dispersing agent are charged into a polymerization vessel, and thereafter a polymerization initiator is charged. Subsequently, the polymerization vessel is evacuated to reduce the internal pressure to a value of 0.1 to 760 mmHg, and a monomer is then charged (whereupon the internal pressure usually takes a value of from 0.5 to 30 kgf/cm$^2$.G). Thereafter, polymerization is carried out at a reaction temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel has fallen to a value of 0 to 7 kgf/cm$^2$.G or when cooling water which is let flow into and out of a jacket provided around the polymerization vessel has come to show approximately equal inlet and outlet temperatures (i.e., when liberation of heat due to polymerization reaction has subsided). The amounts of the water, dispersing agent and polymerization initiator to be charged for polymerization are 20 to 500 parts by weight, 0.01 to 30 parts by weight, and 0.01 to 5 parts by weight, respectively, per 100 parts by weight of the monomer.

In solution polymerization, an organic solvent such as toluene, xylene, pyridine, etc. is used as the polymerization medium, in place of water. A dispersing agent may be used, if necessary. The other conditions for polymerization are generally the same as those described for suspension and emulsion polymerizations.

In bulk polymerization, after a polymerization vessel is evacuated to a pressure of from about 0.01 mmHg to about 760 mmHg, a monomer and a polymerization initiator are charged into the polymerization vessel, and then polymerization is carried out at a reaction temperature of from −10° C. to 250° C. For example, the reaction temperature is 30° to 80° C. for polymerization of vinyl chloride, and is 50° to 150° C. for polymerization of styrene.

Where polymerization is carried out by applying the process of the present invention, it is possible to prevent polymer scale from being deposited, regardless of the materials of the inner wall, etc. of a polymerization vessel. For example, where the polymerization vessel is made of a stainless steel or other steel as well as where the polymerization vessel is a glass-lined one or the like, the polymer scale deposition can be prevented from occurring during polymerization.

Those additive materials which are conventionally added in polymerization systems can be used without any limitations. That is to say, the process of the present invention can effectively prevent polymer scale deposition in polymerization systems which may contain additive materials including, for example, polymerization initiators such as t-butyl peroxyneodecanoate, bis(2-ethylhexyl)peroxydicarbonate, 3,5,5-trimethylhexanoyl peroxide, α-cumyl peroxide neodecanoate, cumene hydroperoxide, cyclohexanone peroxide, t-butyl peroxypivalate, bis(2-ethoxyethyl)peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g. hydroxypropyl methyl cellulose), gelatin, etc.; solid dispersing agents such as calcium phosphate, hydroxyapatite, etc.; nonionic emulsifying agents such as sorbitan monolaurate, sorbitan trioleate, polyoxyethylene alkyl ether, etc.; anionic emulsifying agents such as sodium lauryl sulfate, sodium alkylbenzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; DDP; plasticizers such as DBP, etc.; chain transfer agents such as mercaptans (e.g. t-dodecyl mercaptan), trichloroethylene, etc.; pH adjusters, and so forth.

In addition to being used for formation of the coating on the inner wall surfaces, etc. of the polymerization vessel, the polymer scale preventive agent of the present invention may further be added directly to the polymerization system, whereby a further enhanced effect in preventing deposition of polymer scale can be obtained. In that case, the addition amount of the agent suitably ranges from about 10 to about 1000 ppm based on the total weight of the monomer or monomers charged into the polymerization vessel. At the time of adding the polymer scale preventive agent, care should be taken not to affect adversely the fish eye, bulk specific gravity, particle size distribution or other qualities of the resulting polymeric product.

EXAMPLES

The present invention will now be described in detail below, with reference to working examples thereof and comparative examples. In the tables below, the experiments bearing a No. marked with * are comparative examples, and the other experiments, bearing a nonmarked No., are working examples of the present invention.

Preparation of condensation product No. 1

A 1-liter, three-necked separable flask equipped with a reflux condenser, thermometer and stirrer was charged with 0.5 kg of water, 0.4 kg of methanol, 70 g of 3,3'-dimethyl-4,4'-diaminobiphenyl-6,6'-disulfonic acid as component (A-1), 30 g of α-naphthoquinone as component (A-2) and 20 g of NaOH. The total concentration of (A-1)+(A-2) was 10% by weight, and the weight ratio of (A-1):(A-2) was 100:43. Next, while the flask was heated at 70° C. with an oil bath, the reaction mixture in the flask was reacted under stirring for 20 hours. After the reaction was over, the reaction system was cooled to give a solution containing a condensation product, hereinafter referred to as condensation product No. 1.

Preparation of condensation product Nos. 2 to 8

The procedure of preparing the condensation product No. 1 as above was repeated in the same manner except that a diaminodiphenyl compound (A-1) and a quinone compound (A-2) as given in Table 1 were used and condensation reaction was carried out under the conditions as given in Table 1 (weight ratio of (A-1):(A-2), total concentration of (A-1)+(A-2), concentration of NaOH, reaction temperature, and reaction time), to produce solutions containing respective condensation products.

TABLE 1

| Condensation product No. | Diaminodiphenyl compound (A-1) | Quinone compound (A-2) | Total concentration of (A-1) + (A-2) (wt. %) | (A-1):(A-2) (wt. ratio) | Solvent (wt. ratio) | NaOH concentration (wt. %) | Reaction temp. (°C.) | Reaction time (hr) |
|---|---|---|---|---|---|---|---|---|
| 1 | 3,3'-Dimethyl-4,4'-diaminobiphenyl-6,6'-disulfonic acid | α-Naphthoquinone | 10 | 100:43 | Water:Methanol (100:80) | 2 | 70 | 20 |
| 2* | 3,3'-Dimethyl-4,4'-diaminobiphenyl-6,6'-disulfonic acid | — | 10 | 100:0 | Water:Methanol (100:80) | 2 | 70 | 20 |
| 3* | — | α-Naphthoquinone | 10 | 0:100 | Water:Methanol (100:80) | — | 70 | 20 |
| 4 | 3,3'-Dimethyl-4,4'-diaminobiphenyl-6,6'-disulfonic acid | Lawsone | 5 | 100:100 | Water:Methanol (100:100) | 2 | 70 | 20 |
| 5 | 3,3'-Dimethyl-4,4'-diaminobiphenyl-6,6'-disulfonic acid | p-Benzoquinone | 5 | 100:200 | Water:Methanol (100:50) | 2 | Room temp. | 30 |
| 6 | 4,4'-Diaminobiphenyl-3,3'-dicarboxylic acid | p-Benzoquinone | 10 | 100:100 | Water:Methanol (100:200) | 2 | 70 | 10 |
| 7 | 4,4'-Diaminobiphenyl-3,3'-dicarboxylic acid | p-Benzoquinone | 10 | 100:100 | Water | 2 | 70 | 10 |
| 8 | 4,4'-Diaminobiphenyl-3,3'-diol | α-Naphthoquinone | 10 | 100:50 | Acetone | — | 70 | 20 |

Example 1 (Experiment Nos. 101 to 108)

In each experiment, a stainless-steel polymerization vessel having an internal capacity of 1000 liters and equipped with a stirrer was used to carry out polymerization in the manner as follows. The condensation product (A), water-soluble polymeric compound (B), inorganic colloid (C), alkaline compound and solvent used in each experiment are set forth in Table 2. The inorganic colloids used are given in Table 3. First, in each experiment, the condensation product (A), water-soluble polymeric compound (B) and inorganic colloid (C) were added to the solvent in a weight ratio of (A):(B):(C) and a total concentration of (A)+(B)+(C) as shown in Table 2. To the resulting admixture, the alkaline compound was added so as to give a pH as shown in Table 2, thereby preparing a coating liquid. The coating liquid was applied to the inner wall of the polymerization vessel and to the stirring shaft, stirring blades and other areas with which the monomer comes into contact during polymerization. The coating liquid applied was dried by heating at 40° C. for 15 minutes to form a coating, followed by washing with water.

The experiments respectively bearing No. 102 and No. 103 which are marked with * in Table 2 are comparative examples, wherein a coating liquid not meeting the requirements of the present invention was used.

Subsequently, in each experiment, the polymerization vessel provided with the coating by the coating treatment as above was charged with 400 kg of water, 200 kg of vinyl chloride, 250 g of partially saponified polyvinyl alcohol, 25 g of hydroxypropyl methyl cellulose and 70 g of 3,5,5-trimethylhexanoyl peroxide, followed by polymerization with stirring at 66° C. for 6 hours. After the polymerization was finished, the polymeric product and unreacted monomer were recovered, and the inside of the polymerization vessel was washed with water to remove residual resin.

Thereafter, a batch of operations from the charging of raw materials and the like through polymerization to the washing of the inside of polymerization vessel with water was repeated, without carrying out the coating operation, the repetition number of batch being given in Table 2. After the final batch was over, the amount of polymer scale deposited on areas located in the liquid-phase region and that on areas-around the interface between gas and liquid phases inside the polymerization vessel were determined according to the method described below. The results are given in Table 2.

Furthermore, the number of fish eyes appearing upon formation of a polymer into a sheet was determined, according to the method below, for the polymers obtained in these experiments. The results are given in Table 2.

Measurement of the amount of polymer scale deposited

The scale deposited in an area of 10 cm square at a predetermined location on the inner wall of a polymerization vessel is scraped off with a stainless steel spatula as completely as can be confirmed with the naked eye, and then the scraped scale is weighed on a balance. The measured value is multiplied by 100 to obtain the amount of the deposited polymer scale per area of 1 $m^2$.

Measurement of fish eyes

A hundred (100) parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The obtained sheet is examined for the number of fish eyes per 100 $cm^2$ by light transmission.

Further, measurement of luminosity index (L value) of a sheet formed from a polymer was carried out, according to the method below, with respect to the polymers produced in the experiments. The results are given in Table 2.

Measurement of luminosity index (L value)

A hundred (100) parts by weight of the obtained polymer, 1 part by weight of a tin laurate stabilizing agent (TS-101, product of Akisima Chemical Co.) and 0.5 part by weight of a cadmium stabilizing agent (C-100J, product of Katsuta Kako Co.), and 50 parts by weight of DOP as a plasticizer are kneaded at 160° C. for 5 minutes with a twin roll mill, and then formed into a sheet 1 mm thick. Subsequently, this sheet is placed in a mold measuring 4×4×1.5 cm, heated at 160° C. under a pressure of 65 to 70 kgf/$cm^2$ for 0.2 hour and press molded under the same conditions to prepare a test specimen. This test specimen is measured for luminosity index L in the Hunter's color difference equation described in JIS Z 8730 (1980). The greater the value of L, the higher the whiteness evaluated, namely, the slighter the initial coloration evaluated.

The value of L is determined as follows.

The stimulus value Y of XYZ color system is determined by the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted. From the stimulus value Y obtained, the L value is calculated based on the equation: $L = 10Y^{\frac{1}{2}}$ described in JIS Z 8730 (1980).

TABLE 2

| | Coating liquid | | | | | | | | | Results of polymerization | | | |
|---|---|---|---|---|---|---|---|---|---|---|---|---|---|
| | Condensation product No. (A) | Water-soluble polymeric compound (B) | Inorganic colloid (C) | Total concentration of (A) + (B) + (C) (wt. %) | (A):(B):(C) (wt. ratio) | Alkaline compound | pH | Solvent (wt. ratio) | Repetition number of batch | Polymer scale amount (g/$m^2$) | | Number of fish eyes | L value |
| Exp. No. | | | | | | | | | | Liquid phase | Gas liquid interface | | |
| 101 | 1 | — | — | 0.5 | 100:0:0 | NaOH | 12.5 | Water: Methanol (90:10) | 3 | 0 | 2 | 5 | 73.0 |
| 102* | 2 | — | — | 0.5 | 100:0:0 | NaOH | 12.5 | Water: Methanol (90:10) | 2 | 30 | 900 | 40 | 73.0 |
| 103* | 3 | — | — | 0.5 | 100:0:0 | NaOH | 12.5 | Water: Methanol (90:10) | 2 | 30 | 920 | 46 | 73.0 |
| 104 | 4 | Polyvinyl pyrrolidone | — | 0.5 | 100:100:0 | NaOH | 12.5 | Water: Methanol (90:10) | 3 | 0 | 2 | 4 | 73.0 |

TABLE 2-continued

| | Coating liquid | | | | | | | | | Results of polymerization | | | |
|---|---|---|---|---|---|---|---|---|---|---|---|---|---|
| | Con- | Water- | | Total | | | | | | Polymer scale | | | |
| | densa- | soluble | | concen- | | | | | Repe- | amount (g/m²) | | Num- | |
| | tion | poly- | | tration | | Alka- | | | tition | | Gas | ber | |
| | pro- | meric | In- | of | | line | | | number | | liquid | of | |
| Exp. | duct | com- | organic | (A) + (B) + | (A):(B):(C) | com- | | Solvent | of | Liquid | inter- | fish | L |
| No. | No. (A) | pound (B) | colloid (C) | (C) (wt. %) | (wt. ratio) | pound | pH | (wt. ratio) | batch | phase | face | eyes | value |
| 105 | 5 | — | Snow-tex CXS9 | 0.5 | 0:100:0 | NaOH | 12.0 | Water: Methanol (80:20) | 4 | 0 | 8 | 6 | 73.0 |
| 106 | 6 | Polyvinyl pyrrolidone | Snow-tex CXS9 | 0.5 | 100:100:100 | NaOH | 12.0 | Water: Acetone (80:20) | 5 | 0 | 8 | 7 | 73.0 |
| 107 | 7 | Gelatin | Aluminum oxide | 0.25 | 100:150:50 | Ethylenediamine | 12.0 | Water: Methanol (90:10) | 4 | 0 | 10 | 12 | 73.0 |
| 108 | 8 | Polyvinyl alcohol | Titanium oxide | 0.25 | 100:50:100 | Ethylenediamine | 12.0 | Water: Methanol (90:10) | 4 | 0 | 18 | 16 | 73.0 |

TABLE 3

| Colloid[*1] | Diameter of colloidal particles (mµ) | Name of article |
|---|---|---|
| Colloidal silica (a) | 10–20 | Snowtex O[*2] |
| Colloidal silica (b) | 5–7 | Snowtex CXS-9[*2] |
| Titanium oxide colloid | 100–200 | — |
| Alumina colloid | 10–20 | — |
| Zirconium oxide colloid | 60–70 | — |
| Tin oxide colloid | 20–50 | — |
| Iron hydroxide colloid | 10–15 | — |

Notes
[*1]Iron hydroxide colloid was prepared by the present inventors, and the other colloids are products by Nissan Chemical Industries, Ltd.
[*2]Trade name.

Example 2 (Experiment Nos. 201 to 207)

Using a stainless-steel polymerization vessel having an internal capacity of 20 liters and equipped with a stirrer, polymerization was carried out as follows.

In each experiment, a coating liquid was prepared by using the condensation product, alkaline compound and solvent as given in Table 4 in such amounts as to have the pH and concentration as shown in the table. In the same manner as in Example 1, the coating liquids were each applied to the inner wall, the stirring shaft, the stirring blades and other areas with which a monomer comes into contact of the polymerization vessel, to form a coating, followed by washing with water.

The experiments respectively bearing No. 202 and No. 203 which are marked with * in Table 4 are comparative examples, wherein a coating liquid not satisfying the requirements of the present invention was used.

Subsequently, the polymerization vessel thus coated was charged with 9 kg of water, 225 g of sodium dodecylbenzenesulfonate, 12 g of t-dodecyl mercaptan and 13 g of potassium peroxodisulfate. The inside atmosphere of the polymerization vessel was replaced with nitrogen gas, thereafter 1.3 kg of styrene and 3.8 kg of butadiene were charged into the vessel, and polymerization was carried out at 50° C. for 20 hours. After the polymerization was completed, the polymeric product and unreacted monomers were recovered, followed by washing the inside of the vessel with water to remove residual resin.

Thereafter, a batch of operations from the charging of raw materials and the like through polymerization to the washing of the inside of polymerization vessel with water was repeated, without carrying out the coating operation, the repetition number of batch being given in Table 4. After the final batch was over, the amount of polymer scale deposited on areas located in the liquid-phase region and that on areas around the interface between gas and liquid phases inside the polymerization vessel were determined in the same manner as in Example 1. The results are given in Table 4.

Besides, measurement of luminosity index (L value) of a sheet formed from a polymer was carried out with respect to each of the polymers produced in the experiments, according to the method below. The results are given in Table 4.

Measurement of luminosity index (L value)

To 1 kg of the polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin.

The resin was placed in a mold measuring 9×9×0.1 cm (depth), heated at 195° C. under a pressure of 50 to 60 kgf/cm² for 0.2 hour and press molded under a final pressure of 80 kgf/cm² to prepare a test specimen. This test specimen was measured for luminosity index L in the same manner as described above.

TABLE 4

| Exp. No. | Conden-sation product No. (A) | Water-soluble polymeric compound (B) | In-organic colloid (C) | Total concentration of (A) + (B) + (C) (wt. %) | (A):(B):(C) (wt. ratio) | Alkaline compound | pH | Solvent (wt. ratio) | Repetition number of batch | Polymer scale amount (g/m$^2$) Liquid phase | Polymer scale amount (g/m$^2$) Gas liquid interface | L value |
|---|---|---|---|---|---|---|---|---|---|---|---|---|
| 201 | 1 | Gelatin | Colloidal silica (a) | 0.5 | 100:100:100 | NaOH | 12.0 | Water: Methanol (80:20) | 2 | 0 | 8 | 85.0 |
| 202* | 2 | — | — | 0.5 | 100:0:0 | NaOH | 12.0 | Water: Methanol (80:20) | 2 | 35 | 380 | 85.0 |
| 203* | 3 | — | — | 0.5 | 100:0:0 | NaOH | 12.0 | Water: Methanol (80:20) | 2 | 38 | 400 | 85.0 |
| 204 | 4 | Pectin | Tin oxide | 0.5 | 100:300:50 | NaOH | 12.0 | Water: Methanol (80:20) | 2 | 0 | 7 | 85.0 |
| 205 | 5 | Na salt of carboxymethyl cellulose | Zirconium oxide | 0.5 | 100:200:100 | NaOH | 12.0 | Water: Methanol (70:30) | 2 | 0 | 6 | 85.0 |
| 206 | 6 | Casein | Iron hydroxide | 0.5 | 100:50:200 | Ethylenediamine | 12.0 | Water: Methanol (70:30) | 2 | 0 | 6 | 85.0 |
| 207 | 7 | Polyacrylic acid | Colloidal silica (b) | 0.5 | 100:100:300 | Ethylenediamine | 12.0 | Water: Acetone (70:30) | 2 | 0 | 10 | 85.0 |

Example 3

Using a stainless-steel polymerization vessel having an internal capacity of 100 liters and equipped with a stirrer, polymerization was carried out as follows.

The coating liquid used in Experiment No. 106 was applied to the inner wall, the stirring shaft, the stirring blades and other areas with which a monomer during polymerization comes into contact of the polymerization vessel, and was dried by heating at 50° C. for 15 minutes to form a coating, followed by washing with water.

Subsequently, the polymerization vessel thus provided with the coating was charged with 40 kg of water, 500 g of disproportionated potassium rhodinate, 13 kg of polybutadiene latex (solid content: 45%), 9 kg of styrene monomer, 5 kg of acrylonitrile monomer, 40 g of t-dodecyl mercaptan and 140 g of cumene hydroperoxide. At the time when the temperature inside the polymerization vessel was 47° C., 200 g of grape sugar, 2 g of ferrous sulfate and 100 g of sodium pyrophosphate were charged into the vessel, and polymerization was carried out with stirring at 65° C. for 4 hours.

After the polymerization was over, the polymeric product and unreacted monomers were recovered, and the inside of the polymerization vessel was washed with water to remove residual resin.

Thereafter, a batch of operations from the formation of the coating through polymerization to the washing of the inside of the polymerization vessel with water was repeated 100 times. Upon the 100th batch, the amount of polymer scale deposited on areas located in the liquid-phase region and that on areas around the interface between gas and liquid phases inside the polymerization vessel were measured in the same manner as in Example 1. The measured amounts of polymer scale deposited were 0 g/m$^2$ (liquid phase) and 15 g/m$^2$ (around gas-liquid interface), respectively.

Example 4

Using a stainless-steel polymerization vessel having an internal capacity of 20 liters and equipped with a stirrer, polymerization was carried out as follows.

The coating liquid used in Experiment No. 207 was applied to the inner wall, the stirring shaft, the stirring blades and other areas with which a monomer comes into contact of the polymerization vessel, and was dried by heating at 50° C. for 15 minutes to form a coating, followed by washing with water.

Subsequently, the polymerization vessel thus provided with the coating was charged with 4.0 kg of water and 6 g of sodium dodecylbenzenesulfonate, and temperature was raised to 60° C. with stirring. After the gas phase in the polymerization vessel was replaced with nitrogen gas, the vessel was further charged with 94 g of n-butyl acrylate, 220 g of methyl methacrylate, 5 g of acrylic acid and 5 g of methacrylic acid. Subsequently, 1 g of ammonium persulfate and 1 g of sodium hydrosulfite were charged into the polymerization vessel, and the resulting mixture in the vessel was stirred for 20 minutes.

Furthermore, into the polymerization vessel were added a monomeric mixture (prepared by mixing 2.1 kg of n-butyl acrylate, 4.8 kg of methyl methacrylate, 100 g of acrylic acid and 100 g of methacrylic acid), 500 g of an aqueous 1 wt. % ammonium persulfate solution, 500 g of an aqueous 1 wt. % sodium hydrosulfite solution and 2.0 kg of an aqueous 25 wt. % polyoxyethylene nonyl phenyl ether solution, evenly over a 3-hour period. After the addition was completed, the polymerization vessel was heated to 70° C. and polymerization was carried out for 2 hours.

After the polymerization was over, the resulting polymeric product and unreacted monomers were recovered, and the inside of the vessel was washed with water to remove residual resin.

Thereafter, a batch of operations from the formation of the coating through polymerization to the washing of the inside of the polymerization vessel with water was repeated 100 times. Upon the 100th batch, the amount of polymer scale deposited on areas located in the liquid-phase region and that on areas around the interface between gas and liquid phases inside the polymerization vessel were measured in the same manner as in Example 1. The measured amounts of polymer scale deposited were 0 g/m² (liquid phase) and 25 g/m² (around gas-liquid interface), respectively.

Preparation of condensation product No. 9

A three-necked, 1-liter separable flask equipped with a reflux condenser, thermometer and stirrer was charged with 0.5 kg of water, 0.4 kg of methanol, 54 g of 4,4'-diaminostilbene-2,2'-disulfonic acid as component (A-1), 46 g of α-naphthoquinone as component (A-2), and 20 g of NaOH. The total concentration of (A-1)+(A-2) was 10% by weight, and the weight ratio of (A-1):(A-2) was 100:85. Then, while the flask was heated at 70° C. with an oil bath, the reaction mixture in the flask was reacted under stirring for 20 hours. After the reaction was over, the reaction mixture was cooled to give a solution containing a condensation product, hereinafter referred to as condensation product No. 9.

Preparation of condensation product Nos. 10 to 15

The procedure of preparing the condensation product No. 9 as above was repeated in the same manner except that a diaminostilbene compound (A-1) and a quinone compound (A-2) as given in Table 5 were used and condensation reaction was carried out under the conditions as given in Table 5 (weight ratio of (A-1):(A-2), total concentration of (A-1)+(A-2), concentration of NaOH, reaction temperature, and reaction time), to produce solutions containing respective condensation products, hereinafter referred to as condensation product Nos. 10 to 15, respectively.

ble polymeric compound (B) and inorganic colloid (C) were added to the solvent in a weight ratio of (A):(B):(C) and a total concentration of (A)+(B)+(C) as shown in Table 6. To the resulting admixture, the alkaline compound was added so as to give a pH as shown in Table 6, thereby preparing a coating liquid. The coating liquid was applied to the inner wall of the polymerization vessel and to the stirring shaft, stirring blades and other areas with which a monomer comes into contact during polymerization. The coating liquid applied was dried by heating at 40° C. for 15 minutes to form a coating, followed by washing with water.

The experiments respectively bearing No. 502 and No. 503 which are marked with * in Table 6 are comparative examples, wherein a coating liquid not meeting the requirements of the present invention was used.

Subsequently, in each experiment, the polymerization vessel provided with the coating by the coating treatment as above was charged with 400 kg of water, 200 kg of vinyl chloride, 250 g of partially saponified polyvinyl alcohol, 25 g of hydroxypropyl methyl cellulose and 70 g of 3,5,5-trimethylhexanoyl peroxide, followed by polymerization with stirring at 66° C. for 6 hours. After the polymerization was finished, the polymeric product and unreacted monomer were recovered, and the inside of the polymerization vessel was washed with water to remove residual resin.

Thereafter, a batch of operations from the charging of raw materials and the like through polymerization to the washing of the inside of polymerization vessel with water was repeated, without carrying out the coating operation, the repetition number of batch being given in Table 6. After the final batch was over, the amount of polymer scale deposited on areas located in the liquid-phase region and that on areas around the interface between gas and liquid phases inside the polymerization vessel were determined according to the same method

TABLE 5

| Condensation product No. | Diaminostilbene compound (A-1) | Quinone compound (A-1) + (A-2) | Total concentration of (A-1) + (A-2) (wt. %) | (A-1):(A-2) (wt. ratio) | Solvent (wt. ratio) | NaOH concentration (wt. %) | Reaction temp. (°C.) | Reaction time (hr) |
|---|---|---|---|---|---|---|---|---|
| 9 | 4,4'-Diaminostilbene-2,2'-disulfonic acid | α-Naphthoquinone | 10 | 100:43 | Water:Methanol (100:80) | 2 | 70 | 20 |
| 10* | 4,4'-Diaminostilbene-2,2'-disulfonic acid | — | 10 | 100:0 | Water:Methanol (100:80) | 2 | 70 | 20 |
| 11* | — | α-Naphthoquinone | 10 | 0:100 | Water:Methanol (100:80) | — | 70 | 20 |
| 12 | 4,4'-Diaminostilbene-2,2'-disulfonic acid | Lawsone | 5 | 100:100 | Water:Methanol (100:100) | 2 | 70 | 20 |
| 13 | 4,4'-Diaminostilbene-2,2'-disulfonic acid | p-Benzoquinone | 5 | 100:200 | Water:Methanol (100:50) | 2 | Room temp. | 30 |
| 14 | 4,4'-Diaminostilbene-3,3'-dicarboxylic acid | p-Benzoquinone | 10 | 100:100 | Water:Methanol (100:200) | 2 | 70 | 10 |
| 15 | 4,4'-Diaminostilbene-3,3'-diol | p-Benzoquinone | 10 | 100:50 | Acetone | 2 | 70 | 10 |

Example 5 (Experiment Nos. 501 to 507)

In each experiment, a stainless-steel polymerization vessel having an internal capacity of 1000 liters and equipped with a stirrer was used to carry out polymerization in the manner as follows. The condensation product (A), water-soluble polymeric compound (B), inorganic colloid (C), alkaline compound and solvent used in each experiment are set forth in Table 6. The inorganic colloids used are given in Table 3. First, in each experiment, the condensation product (A), water-soluas used in Example 1. The results are given in Table 6.

Besides, the number of fish eyes appearing upon formation of a polymer into a sheet was determined, according to the same method as in Example 1, with respect to the polymers obtained in these experiments. The results are given in Table 6.

Furthermore, measurement of luminosity index (L value) of a sheet formed from a polymer was carried out with respect to each of the polymers produced in the experiments, according to the same method as used in Example 1. The results are given in Table 6.

TABLE 6

| Exp. No. | Condensation product (A) | Water-soluble polymeric compound (B) | Inorganic colloid (C) | Total concentration of (A) + (B) + (C) (wt. %) | (A):(B):(C) (wt. ratio) | Alkaline compound | pH | Solvent (wt. ratio) | Repetition number of batch | Polymer scale amount (g/m²) Liquid phase | Polymer scale amount (g/m²) Gas liquid interface | Number of fish eyes | L value |
|---|---|---|---|---|---|---|---|---|---|---|---|---|---|
| 501 | 9 | — | — | 0.5 | 100:0:0 | NaOH | 12.5 | Water:Methanol (90:10) | 3 | 0 | 4 | 6 | 73.0 |
| 502* | 10 | — | — | 0.5 | 100:0:0 | NaOH | 12.5 | Water:Methanol (90:10) | 2 | 30 | 900 | 41 | 73.0 |
| 503* | 11 | — | — | 0.5 | 100:0:0 | NaOH | 12.5 | Water:Methanol (90:10) | 2 | 38 | 960 | 48 | 73.0 |
| 504 | 12 | Polyvinyl pyrrolidone | — | 0.5 | 100:100:0 | NaOH | 12.5 | Water:Methanol (90:10) | 3 | 0 | 4 | 6 | 73.0 |
| 505 | 13 | — | Colloidal silica (b) | 0.5 | 0:100:0 | NaOH | 12.0 | Water:Methanol (80:20) | 4 | 0 | 12 | 8 | 73.0 |
| 506 | 14 | Polyvinyl pyrrolidone | Colloidal silica (a) | 0.5 | 100:100:100 | NaOH | 12.0 | Water:Acetone (80:20) | 5 | 0 | 12 | 9 | 73.0 |
| 507 | 15 | Gelatin | Aluminum oxide | 0.25 | 100:150:50 | Ethylenediamine | 12.0 | Water:Methanol (90:10) | 4 | 0 | 18 | 16 | 73.0 |

Example 6 (Experiment Nos.601 to 607)

Using a stainless-steel polymerization vessel having an internal capacity of 20 liters and equipped with a stirrer, polymerization was carried out as follows.

In each experiment, a coating liquid was prepared by using the condensation product (A), water-soluble polymeric compound (B), inorganic colloid, alkaline compound and solvent as given in Table 7 in such amounts as to have the pH and concentration as shown in the table. In the same manner as in Example 1, the coating liquids were each applied to the inner wall, the stirring shaft, the stirring blades and other areas with which a monomer comes into contact of the polymerization vessel, to form a coating, followed by washing with water.

The experiments respectively bearing No. 602 and No. 603 which are marked with * in Table 7 are comparative examples, wherein a coating liquid not fulfilling the requirements of the present invention was used.

Subsequently, the polymerization vessel thus coated was charged with 9 kg of water, 225 g of sodium dodecylbenzenesulfonate, 12 g of t-dodecyl mercaptan and 13 g of potassium peroxodisulfate. The inside atmosphere of the polymerization vessel was replaced with nitrogen gas, thereafter 1.3 kg of styrene and 3.8 kg of butadiene were charged into the vessel, and polymerization was carried out at 50° C. for 20 hours. After the polymerization was completed, the polymeric product and unreacted monomers were recovered, followed by washing the inside of the vessel with water and removing residual resin.

Thereafter, a batch of operations from the charging of raw materials and the like through polymerization to the washing of the inside of polymerization vessel with water was repeated, without carrying out the coating operation, the repetition number of batch being given in Table 7. After the final batch was over, the amount of polymer scale deposited on areas located in the liquid-phase region and that on areas around the interface between gas and liquid phases inside the polymerization vessel were determined in the same manner as in Example 1. The results are given in Table 7.

Besides, measurement of luminosity index (L value) of a sheet formed from a polymer was carried out, according to the same method as in Example 2, with respect to each of the polymers produced in these experiments. The results are given in Table 7.

TABLE 7

| Exp. No. | Condensation product (A) | Water-soluble polymeric compound (B) | Inorganic colloid (C) | Total concentration of (A) + (B) + (C) (wt. %) | (A):(B):(C) (wt. ratio) | Alkaline compound | pH | Solvent (wt. ratio) | Repetition number of batch | Polymer scale amount (g/m²) Liquid phase | Polymer scale amount (g/m²) Gas liquid interface | L value |
|---|---|---|---|---|---|---|---|---|---|---|---|---|
| 601 | 9 | Gelatin | Colloidal silica (a) | 0.5 | 100:100:100 | NaOH | 12.0 | Water:Methanol (80:20) | 2 | 0 | 2 | 85.0 |
| 602* | 10 | — | — | 0.5 | 100:0:0 | NaOH | 12.0 | Water:Methanol | 2 | 35 | 370 | 85.0 |

TABLE 7-continued

| | Coating liquid | | | | | | | | Results of polymerization | | |
|---|---|---|---|---|---|---|---|---|---|---|---|
| | | | | Total concentration | | | | | Repetition | Polymer scale amount (g/m²) | | |
| Exp. No. | Condensation product No. (A) | Water-soluble polymeric compound (B) | Inorganic colloid (C) | of (A) + (B) + (C) (wt. %) | (A):(B):(C) (wt. ratio) | Alkaline compound | pH | Solvent (wt. ratio) | number of batch | Liquid phase | Gas liquid interface | L value |
| 603* | 11 | — | — | 0.5 | 100:0:0 | NaOH | 12.0 | Water: Methanol (80:20) | 2 | 40 | 410 | 85.0 |
| 604 | 12 | Pectin | Tin oxide | 0.5 | 100:300:50 | NaOH | 12.0 | Water: Methanol (80:20) | 2 | 0 | 2 | 85.0 |
| 605 | 13 | Na salt of carboxymethyl cellulose | Zirconium oxide | 0.5 | 100:200:100 | NaOH | 12.0 | Water: Methanol (80:20) | 2 | 0 | 2 | 85.0 |
| 606 | 14 | Casein | Iron hydroxide | 0.5 | 100:50:200 | Ethylenediamine | 12.0 | Water: Methanol (70:30) | 2 | 0 | 3 | 85.0 |
| 607 | 15 | Polyacrylic acid | Colloidal silica (b) | 0.5 | 100:100:300 | Ethylenediamine | 12.0 | Water: Acetone (70:30) | 2 | 0 | 4 | 85.0 |

Example 7

Using a stainless-steel polymerization vessel having an internal capacity of 100 liters and equipped with a stirrer, polymerization was carried out as follows.

The coating liquid used in Experiment No. 607 was applied to the inner wall, the stirring shaft, the stirring blades and other areas with which a monomer during polymerization comes into contact of the polymerization vessel, and was dried by heating at 50° C. for 15 minutes to form a coating, followed by washing with water.

Subsequently, the polymerization vessel thus provided with the coating was charged with 40 kg of water, 500 g of disproportionated potassium rhodinate, 13 kg of polybutadiene latex (solid content: 45%), 9 kg of styrene monomer, 5 kg of acrylonitrile monomer, 40 g of t-dodecyl mercaptan and 140 g of cumene hydroperoxide. At the time when the temperature inside the polymerization vessel was 47° C., 200 g of grape sugar, 2 g of ferrous sulfate and 100 g of sodium pyrophosphate were charged into the vessel, and polymerization was carried out with stirring at 65° C. for 4 hours.

After the polymerization was over, the polymeric product and unreacted monomers were recovered, and the inside of the polymerization vessel was washed with water to remove residual resin.

Thereafter, a batch of operations from the formation of the coating through polymerization to the washing of the inside of the polymerization vessel with water was repeated 80 times. Upon the 80th batch, the amount of polymer scale deposited on areas located in the liquid-phase region and that on areas around the interface between gas and liquid phases inside the polymerization vessel were measured in the same manner as in Example 1. The measured amounts of polymer scale deposited were 0 g/m² (liquid phase) and 5 g/m² (around gas-liquid interface), respectively.

Example 8

Using a stainless-steel polymerization vessel having an internal capacity of 20 liters and equipped with a stirrer, polymerization was carried out as follows.

The coating liquid used in Experiment No. 506 was applied to the inner wall, the stirring shaft, the stirring blades and other areas with which a monomer during polymerization comes into contact of the polymerization vessel, and was dried by heating at 50° C. for 15 minutes to form a coating, followed by washing with water.

Subsequently, the polymerization vessel thus provided with the coating was charged with 4.0 kg of water and 6 g of sodium dodecylbenzenesulfonate, and temperature was raised to 60° C. with stirring. After the gas phase in the polymerization vessel was replaced with nitrogen gas, the vessel was further charged with 94 g of n-butyl acrylate, 220 g of methyl methacrylate, 5 g of acrylic acid and 5 g of methacrylic acid. Subsequently, 1 g of ammonium persulfate and 1 g of sodium hydrosulfite were charged into the polymerization vessel, and the resulting mixture in the vessel was stirred for 20 minutes.

Furthermore, into the polymerization vessel were added a monomeric mixture (prepared by mixing 2.1 kg of n-butyl acrylate, 4.8 kg of methyl methacrylate, 100 g of acrylic acid and 100 g of methacrylic acid), 500 g of an aqueous 1 wt. % ammonium persulfate solution, 500 g of an aqueous 1 wt. % sodium hydrosulfite solution and 2.0 kg of an aqueous 25 wt. % polyoxyethylene nonyl phenyl ether solution, evenly over a 3-hour period. After the addition was completed, the polymerization vessel was heated to 70° C. and polymerization was carried out for 2 hours.

After the polymerization was over, the resulting polymeric product and unreacted monomers were recovered, and the inside of the vessel was washed with water to remove residual resin.

Thereafter, a batch of operations from the formation of the coating through polymerization to the washing of the inside of the polymerization vessel with water was repeated 80 times. Upon the 80th batch, the amount of polymer scale deposited on areas located in the liquid-phase region and that on areas around the interface between gas and liquid phases inside the polymerization vessel were measured in the same manner as in Example 1. The measured amounts of polymer scale deposited were 0 g/m² (liquid phase) and 8 g/m² (around gas-liquid interface), respectively.

We claim:

1. A process for producing a polymer of a monomer having an ethylenically unsaturated double bond, which comprises polymerizing the monomer in a polymerization vessel having a coating on its inner wall surfaces, for preventing polymer scale from being deposited, wherein said coating has been formed by applying an alkaline solution containing (A) a condensation product of reactants consisting of:

(A-1) a diamino aromatic compound having the general formula (1):

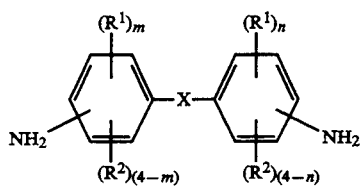

wherein $R^1$ is at least one group selected from the group consisting of —OH, —COOH and —SO$_3$H, $R^2$ is a hydrogen atom or a substituent group, X is a single bond or a divalent group of the formula —CH=CH—, and m and n are each an integer from 0 to 4, provided m and n are not simultaneously zero, when a plurality of $R^1$ groups are present they may be identical or different, and when a plurality of $R^2$ groups are present they may be identical or different, with (A-2) a quinone compound, followed by drying.

2. The process of claim 1, wherein said polymerization is conducted as suspension polymerization, emulsion polymerization, solution polymerization, bulk polymerization or gas phase polymerization.

3. The process of claim 1, wherein said monomer comprises at least one compound selected from the group consisting of vinyl halides; vinyl esters; acrylic acid, methacrylic acid, and their esters and salts; maleic acid, fumaric acid, and their esters and anhydrides; diene monomers; styrene; acrylonitrile; vinylidene halides; and vinyl ethers.

4. The process of claim 1, wherein the component (A-1) comprises a diaminodiphenyl compound having the formula (2):

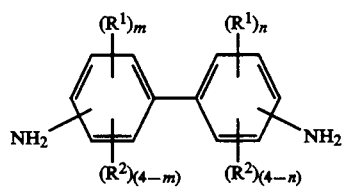

wherein m and n are each an integer from 1 to 4, $R^1$ is at least one group selected from the group consisting of —OH, —COOH and —SO$_3$H, and $R^2$ is at least one atom or group selected from the group consisting of —H, —NH$_2$, —Cl, —Br, —NO$_2$, —COCH$_3$, —OCH$_3$, —N(CH$_3$)$_2$ and alkyl groups of from 1 to 3 carbon atoms, provided when a plurality of $R^1$ groups are present they may be identical or different, and when a plurality of $R^2$ groups are present they may be identical or different.

5. The process of claim 4, wherein the component (A-1) is selected from the group consisting of 4,4'-diaminobiphenyl-3,3'-diol, 4,4'-diaminobiphenyl-3,3'-dicarboxylic acid, 4,4'-diaminodiphenyl-3,3'-disulfonic acid, and 3,3'-dimethyl-4,4'-diaminobiphenyl-6,6'-disulfonic acid.

6. The process of claim 1, wherein the component (A-1) comprises a diaminostilbene compound having the formula (3):

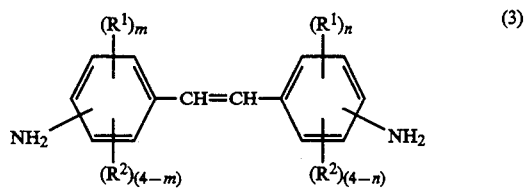

wherein m and n are each an integer from 1 to 4, $R^1$ is a group selected from the group consisting of —OH, —COOH and —SO$_3$H, and $R^2$ is at least one atom or group selected from the group consisting of —H, —NH$_2$, —Cl, —Br, —NO$_2$, —COCH$_3$, —OCH$_3$, —N(CH$_3$)$_2$ and alkyl groups of from 1 to 3 carbon atoms, provided when a plurality of $R^1$ groups are present they may be identical or different, and when a plurality of $R^2$ groups are present they may be identical or different.

7. The process of claim 6, wherein the component (A-1) is selected from the group consisting of 4,4'-diaminostilbene-3,3'-diol, 4,4'-diaminostilbene-3,3'-dicarboxylic acid, 4,4'-diaminostilbene-3,3'-disulfonic acid, and 3,3'-dimethyl-4,4'-diaminostilbene-2,2'-disulfonic acid.

8. The process of claim 1, wherein the component (A-2) comprises a compound selected from the group consisting of the compounds of the formulas (4) to (7):

![Formula 4]

![Formula 5]

wherein in the formulas (4) and (5), $R^3$ represents —H, —NH$_2$, —Cl, —OH, —NO$_2$, —COCH$_3$, —OCH$_3$, —N(CH$_3$)$_2$ or an alkyl group of from 1 to 3 carbon atoms, and $R^4$ represents —H, —NH$_2$, —OH, —CH$_3$, —COOH or —SO$_3$H ![Formula 6]

-continued

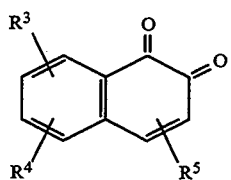
(7)

wherein in the formulas (6) and (7), $R^3$ and $R^4$ are as defined above, and $R^5$ represents —H, —OH, —CH$_3$, —Cl, —COCH$_3$, —OCH$_3$, —COOH or —SO$_3$H.

9. The process of claim 1, wherein the alkaline solution has a pH in the range from 7.5 to 13.5.

10. The process of claim 1, wherein the concentration of the condensation product in the alkaline solution ranges from 0.001 to 5% by weight.

11. The process of claim 1, wherein said alkaline solution further comprises water or a mixed solvent of water and an organic solvent miscible with water, the amount of said organic solvent in said mixed solvent being not more than 50% by weight.

12. The process of claim 1, wherein said coating further comprises at least one compound selected from the group consisting of (B) a water-soluble polymeric compound, and (C) an inorganic colloid.

13. The process of claim 1, wherein the alkaline solution has a pH in the range from 8 to 12.5.

14. The process of claim 1, wherein said coating further comprises (B) a water-soluble polymeric compound and (C) an inorganic colloid.

* * * * *